(12) United States Patent
Averitt et al.

(10) Patent No.: US 8,578,262 B2
(45) Date of Patent: Nov. 5, 2013

(54) CAD-INTERFACED, AUTOMATED SYSTEM FOR ASSISTING THE ARCHITECTURAL PROCESS

(76) Inventors: John W. Averitt, New York, NY (US); Susan Ann Lange, legal representative, New York, NY (US); Charles W. Williams, Carmel, NY (US); Ivan A. Starr, Long Island, NY (US)

( * ) Notice: Subject to any disclaimer, the term of this patent is extended or adjusted under 35 U.S.C. 154(b) by 1467 days.

(21) Appl. No.: 11/736,376

(22) Filed: Apr. 17, 2007

(65) Prior Publication Data

US 2007/0288842 A1   Dec. 13, 2007

Related U.S. Application Data

(63) Continuation-in-part of application No. 10/085,115, filed on Mar. 1, 2002, now abandoned, and a continuation-in-part of application No. 11/184,167, filed on Jul. 19, 2005.

(60) Provisional application No. 60/793,311, filed on Apr. 19, 2006.

(51) Int. Cl.
*G06F 17/50* (2006.01)
*G06F 17/24* (2006.01)

(52) U.S. Cl.
USPC ........... 715/221; 715/243; 715/248; 715/255; 715/764; 715/765; 715/767; 715/771; 715/858

(58) Field of Classification Search
USPC ........... 715/211, 243, 248, 255, 764–67, 771, 715/858
See application file for complete search history.

(56) References Cited

U.S. PATENT DOCUMENTS 3,120,606 A   2/1964   Eckert, Jr. et al.
4,370,707 A   1/1983   Phillips et al.
(Continued)

FOREIGN PATENT DOCUMENTS

WO   WO 01/90852   11/2001

OTHER PUBLICATIONS

ADSWayback, Title: "Architectural Data Systems—Learn More about ADS", published: Aug. 2004, pages: Part A: pp. 1-9, Part B: pp. 1-2, http://www.architecturaldatasystems.com/ADS/company.*

(Continued)

*Primary Examiner* — Stephen Hong
*Assistant Examiner* — Wilson Tsui
(74) *Attorney, Agent, or Firm* — Frost Brown Todd LLC

(57) ABSTRACT

An automated system for assisting the architectural process on an open-network. The system includes a data entry means for user-selected project attributes, at least one catalog database from which the user-selected attribute is identified, a filter for providing a graphical user interface with filtered data associated with a user-selected attribute, at least one user database which stores a unique identifier of the user-selected attribute, automated selection means for incorporating data associated with the user-selected attribute into at least one document, and generation means for creating an architectural document, such as a Specification, Drawing, or Schedule. The system may include at least one remote attribute information storage means from which the user-selected attribute is identified. The system of the present invention may further include means for tracking the architectural process. The system may also include searching means for querying a user database or a group of user databases. The aspect created by the generation means may include Industry Foundation Class or XML tags for industry compatibility for searching.

11 Claims, 10 Drawing Sheets

(56) References Cited

U.S. PATENT DOCUMENTS

| | | | |
|---|---|---|---|
| 4,835,683 A | | 5/1989 | Phillips et al. |
| 4,875,162 A | | 10/1989 | Ferriter et al. |
| 5,111,392 A | * | 5/1992 | Malin ............................ 705/29 |
| 5,122,971 A | | 6/1992 | Kamejima et al. |
| 5,319,541 A | | 6/1994 | Blanchard et al. |
| 5,341,469 A | | 8/1994 | Rossberg et al. |
| 5,761,674 A | | 6/1998 | Ito |
| 5,950,215 A | | 9/1999 | Tabuchi |
| 6,023,702 A | | 2/2000 | Leisten et al. |
| 6,052,669 A | * | 4/2000 | Smith et al. .................... 705/26 |
| 6,075,534 A | | 6/2000 | Van Buskirk et al. |
| 6,236,409 B1 | | 5/2001 | Hartman |
| 6,282,514 B1 | | 8/2001 | Kumashiro |
| 6,405,364 B1 | | 6/2002 | Bowman-Amuah |
| 6,446,053 B1 | | 9/2002 | Elliott |
| 6,691,098 B1 | | 2/2004 | Agrawal et al. |
| 6,795,840 B1 | | 9/2004 | Hillermeier et al. |
| RE38,633 E | | 10/2004 | Srinivasan |
| 6,836,752 B2 | | 12/2004 | Atasoy |
| 6,922,701 B1 | | 7/2005 | Ananian |
| 6,944,622 B1 | | 9/2005 | Mitchell et al. |
| 6,976,213 B1 | | 12/2005 | Letourneau et al. |
| 6,999,965 B1 | * | 2/2006 | Cesarotti et al. ...................... 1/1 |
| 7,006,977 B1 | | 2/2006 | Attra et al. |
| 7,019,759 B1 | | 3/2006 | Moore et al. |
| 7,076,455 B1 | * | 7/2006 | Fogelson ........................ 705/27 |
| 7,096,082 B1 | | 8/2006 | Connelly |
| 7,162,688 B1 | | 1/2007 | Gillig |
| 7,222,330 B2 | | 5/2007 | Bicknell et al. |
| 7,246,044 B2 | | 7/2007 | Imamura et al. |
| 7,249,328 B1 | | 7/2007 | Davis |
| 7,318,053 B1 | | 1/2008 | Cha et al. |
| 7,505,252 B2 | | 3/2009 | Ma |
| 7,529,708 B2 | | 5/2009 | Hogg et al. |
| 7,653,641 B2 | | 1/2010 | Theissen et al. |
| 2001/0032062 A1 | * | 10/2001 | Plaskoff et al. .................... 703/1 |
| 2002/0010522 A1 | | 1/2002 | Martin |
| 2002/0046044 A1 | * | 4/2002 | Johnston et al. .................. 705/1 |
| 2002/0103557 A1 | * | 8/2002 | Land ............................... 700/96 |
| 2002/0130869 A1 | * | 9/2002 | Camiener et al. ............. 345/440 |
| 2003/0078859 A1 | | 4/2003 | Coke, II et al. |
| 2003/0208342 A1 | | 11/2003 | Jung |
| 2004/0111334 A1 | | 6/2004 | Parsons |
| 2004/0177089 A1 | * | 9/2004 | Love et al. ................. 707/103 R |
| 2004/0205528 A1 | | 10/2004 | Alexander |
| 2004/0243421 A1 | | 12/2004 | Jannott et al. |
| 2005/0044010 A1 | | 2/2005 | Jannott et al. |
| 2006/0010081 A1 | | 1/2006 | Williams |
| 2007/0294617 A1 | * | 12/2007 | Kroeger ........................ 715/530 |
| 2008/0010365 A1 | | 1/2008 | Schneider |

OTHER PUBLICATIONS

U.S. Appl. No. 10/085,115, filed Mar. 1, 2002, Averitt et al.
"ADC News Release—ADC Introduces D17 Tools Software," www.adc.com, Jan. 19, 2000.
"A New and Improved SpecWizard is on its way!" search dated Jan. 22, 2008.
"ARCAT—SpecWizard" search dated Jan. 22, 2008.
"Build a Specification," Armstrong Commercial Ceilings, 2000-2008.
Cho, Y.C. et al., "A Computer-Aided Design for the Specification and Performance Evaluation of Elevator Systems," Elevcon 2000 (May 10, 2000) pp. 1-21.
"I Envision . . . " Presto, Mississauga, Ontario, www.envisionIT.com, Est: 1995.
ITWORX Services, 1994-2006.
Search for "ARCAT" dated Jan. 22, 2008.
Search for "ARCAT" dated Jan. 22, 2008 (2).
Trademark Search for "SPECWIZARD" dated Jan. 22, 2008.
"You'll learn why our clients consider us their 'internal' specwriting team!," e-SPECS® Online, Est: after 1998.
Office Action dated Dec. 29, 2008 for U.S. Appl. No. 10/085,115.
Office Action dated Oct. 18, 2007 for U.S. Appl. No. 10/085,115.
Office Action dated Mar. 23, 2007 for U.S. Appl. No. 10/085,115.
Office Action dated Nov. 3, 2006 for U.S. Appl. No. 10/085,115.
Office Action dated May 2, 2006 for U.S. Appl. No. 10/085,115.
Office Action dated Oct. 27, 2005 for U.S. Appl. No. 10/085,115.
Office Action dated Mar. 18, 2010 for U.S. Appl. No. 11/184,167.
Office Action dated Nov. 24, 2009 for U.S. Appl. No. 11/184,167.
Office Action dated Aug. 28, 2009 for U.S. Appl. No. 11/184,167.
Office Action dated May 21, 2009 for U.S. Appl. No. 11/184,167.
Office Action dated Mar. 18, 2009 for U.S. Appl. No. 11/184,167.
Office Action dated Mar. 10, 2010 for U.S. Appl. No. 11/736,376.

* cited by examiner

FIG. 2

CAD-INTERFACED, AUTOMATED SYSTEM FOR ASSISTING THE ARCHITECTURAL PROCESS

CROSS REFERENCE TO RELATED APPLICATIONS

The present application claims the benefit of, and is a continuation in part of, commonly-owned and U.S. patent application Ser. Nos. 10/085,115, filed on Mar. 1, 2002 now abandoned and 11/184,167, filed on Jul. 19, 2005, and also claims the benefit of U.S. Provisional application 60/793,311, filed on Apr. 19, 2006, the disclosures of which are hereby incorporated by reference in their entirety.

BACKGROUND OF THE INVENTION

The typical process by which architects and engineers are hired and do their work includes many steps. For example, an owner develops a concept that describes a proposed building's use and approximate size. He then engages the architect. The architect hires the required engineers, and the team produces a design and a contract document in keeping with the concept and budget. This contract document is composed of computer-generated Drawings and written Schedules and Specifications. Taken together these documents represent all physical and cost aspects of the complete building. Currently, the graphics software used in this process is industry specific; the text software is general business.

The aspects of the contract document, including the Detail, Specification and Schedule, are then bid by general contractors and, after some revisions, are assumable into a contract between the owner and the contractor. The architect observes the construction for compliance with the design.

The architect's prime interest lies in the conceptualization and design development phases. The creation of the aspects of the contract document, however, including the Detail, Specification, and Schedule development (aspects of the contract document), as well as their coordination, require high technical expertise and precision, and are considered drudgery by many. These tasks often suffer from lack of time, interest or sufficient experience. In fact, they are often performed by junior members of the firm who lack the experience to do them efficiently and thus require extensive oversight by senior members of the firm. Shortcomings in the final document may result in project cost overruns for the owner and hours of unanticipated work for the architect.

In view of this, several chronic problems exist in the architectural, engineering and construction industry. One is the backbreaking amount of detail work required of the professionals, within ever shrinking schedules, resulting in higher stress, higher costs and lower incomes. Another is the difficulty and time-consuming process of obtaining manufacturer's information as it is needed. Compounding these problems is the existence of only a few options for automating any portion of the architectural design development process. This industry is one of the least automated of all industries.

Architects and engineers are hired to design buildings and other structures. In order to get these structures built, the architects and engineers produce what is called a contract document, which comprises several complimentary aspects, including the agreement between the Owner and Contractor; the drawings, which include plans, elevations, sections, and Details; Schedules, which list attributes of repetitive building parts such as doors, windows, hardware, and finishes; and the Specifications, which are the written, detailed descriptions of the materials and processes that make up the building. A Schedule, for example, would indicate to a contractor what type of finish a door might have, and a Specification would indicate how that finish is applied.

At present, these aspects are created primarily manually and independently of one another. Even in circumstances where the process of creating aspects of the contract document is automated, that automation is often incomplete, and it often results on less than all of the aspects of the contract document being created, leaving additional manual work for the architect. One such existing system, which includes both incomplete automation and produces only one aspect of the contract document is described in U.S. Pat. No. 6,976,213 to Letourneau, et al. In that system the process of creating an aspect of the contract document is partially automated by correlating pre-written specification sections with user terms found in a computer aided design (CAD) drawing. However, while the specification sections in that invention are pre-written, the process of correlation still involves human intervention (e.g., U.S. Pat. No. 6,976,213, col. 7, 1.66-col. 8, 1.1 "The person scanning the drawing now has the opportunity to 'bind' the user tag brick pavers on sand with the system default tag sand"). Further, even that limited automation generates only the specification aspect of the contract document; the aspects of the detail and schedule must be created manually. Thus in many prior art systems, each of the aspects of the contract document requires its own input and execution, and the coordination between each is done manually by the architect and engineer. Each of these aspects has it own characteristics. Some are project specific and others are simply modifications or variations on a standard Detail.

In preparing aspects of the contract document, including Drawings and Specifications, architects and engineers rely on production tools, such as computer programs, and information, such as manufacturers' literature. Architects and Engineers perform tasks at the levels of output; that is, they produce aspects of a contract document in their final form; there is no intermediate input form process that they use. A Schedule, which is a device used by architects and engineers to provide detailed information about a door, window, room finish or the like, is created for each item in a CAD format or in spreadsheet form where each cell is populated manually. A Detail, which is a drawing that shows the actual assembly of parts, is drawn one line at a time or old files are retrieved and modified. A Specification is prepared by modifying a previous Specification or using a database or word processing-based template. The production tools that attempt to assist with more than one aspect of the contract document do not do so automatically in that the process of generating a second aspect, if it is available at all, requires additional steps beyond a single entry of information into the system. Such additional steps may include downloading a Detail library and separately selecting generic Details that may additionally require modification to reflect the various attributes desired. Thus, the drawing, specifying, and product selection are three distinct processes that are currently disconnected and not automated. More recently, for Specifications, a program using an actual user interface that is not in a word processing format has been available; it uses a directory tree structure. Also available is a program that uses a database format user interface where text is viewed in a data base cell. The present invention advances the automation of the architectural process by use of a system that provides for a single entry of information for assembling the data required, for generating the aspects of the contract document used by Architects and Engineers, and for allowing such single data entry and contract document generation to be integrated with a CAD interface which allows the user to flexibly create architectural drawings.

SUMMARY OF THE INVENTION

The present invention relates to an open-network system for managing the architectural process. A user, usually at a location remote to the database of the system, might use a series of worksheets, presented as a graphical user interface, to input data that is assembled to generate the aspects of the contract document required for the project, including the Specifications, Details, and the Schedules. In some embodiments, the user selects attributes in designing the architectural project, and as appropriate, is provided with choices from one or more sources, such as a manufacturer's catalog, that satisfy the criteria of the attributes selected. In addition to providing specific information to the various aspects of the contract document, this selection and filtering aspect of the invention provides a time-, and therefore, cost-savings for the project by quickly providing information to the user that traditionally an architect or engineer may spend many hours trying to uncover. Further, by connecting the choices made by the user to predefined data stored in databases such as a manufacturer's catalog, the present invention eliminates the problem experienced in some prior art systems of interpreting the terms used by individual users (e.g., U.S. Pat. No. 6,976,213). Additionally, by filtering the choices applicable for a selected set of attributes of a design part, and providing the user with information about that part in a form that is used in generating the aspects of the contract document automatically, errors may be significantly diminished or eliminated. The process may be further facilitated by providing the user with an image, which may be a portion of an image map. In this way, the user may choose parts by clicking on the image. The data associated with that part may then populate the input form and aspects of the contract document, as appropriate for that part.

Some embodiments of the invention might comprise data entry means for user-selected project attributes, at least one catalog database from which the user-selected attribute is identified, each attribute having a unique identifier and data associated with it, a filter for providing a graphical user interface with filtered data associated with a user-selected attribute, at least one user database which stores the unique identifier of the user-selected attribute, automated selection means for incorporating data associated with the user-selected attribute into at least one aspect, and generation means for creating the aspect. The aspects may be the Specification, Detail, Schedule, status of the architectural process, or the like. The data entry means may be a graphical user interface having text entry and drop-down menu choices, or might be a CAD drawing interface. The system may include at least one remote catalog database from which the user-selected attribute is identified, each attribute having a unique identifier and data associated with it. The filter provides the drop-down menu choices of the graphical user interface with filtered data associated with a user-selected attribute. The system of the present invention may further include means for tracking the architectural process. The invention may also include searching means for querying a user database or a group of user databases. The aspect created by the generation means may include Industry Foundation Class tags for industry compatibility. This may be in XML, or other suitable form, such as object-oriented files.

Some embodiments of the present invention might use an input form to gather design information about an architectural project or part of a project for assembly and placement in the aspects of the contract document, including a Schedule, Specification, Detail, or the like, as appropriate. Embodiments might also allow multiple tasks to be performed with a single entry or selection of information. One embodiment of the invention further includes a module for tracking the status of the design process.

Accordingly, it is an object of the present invention to provide a system to enable architects and engineers to integrate their most basic and time-consuming tasks into one task.

Another object of the present invention is to provide a system to enable architects and engineers to generate multiple aspects of the contract document with a single entry of information.

A further object of the present invention is to provide a system to automate the creation of multiple aspects of the contract document.

Still another object of the present invention is to provide a system with resources for preventing errors in creating a contract document.

Yet another object of the present invention is to provide a system that allows for faster completion of a contract document.

Other objects and further scope of applicability of the present invention will become apparent from the detailed description to follow. It should be understood, however, that the detailed description and specific examples, while indicating embodiments of the invention, are given by way of illustration only, since various changes and modifications within the spirit and scope of the invention will become apparent to those skilled in the art.

BRIEF DESCRIPTION OF THE DRAWINGS

FIG. 2 is a screenshot of a browser-based input form.

DETAILED DESCRIPTION

Some embodiments of the present invention might comprise an open-network system operable to facilitate the exchange of information and to provide single entry input forms to the user. Such embodiments might integrate multiple databases that may function simultaneously to provide the desired output.

Figure 1:
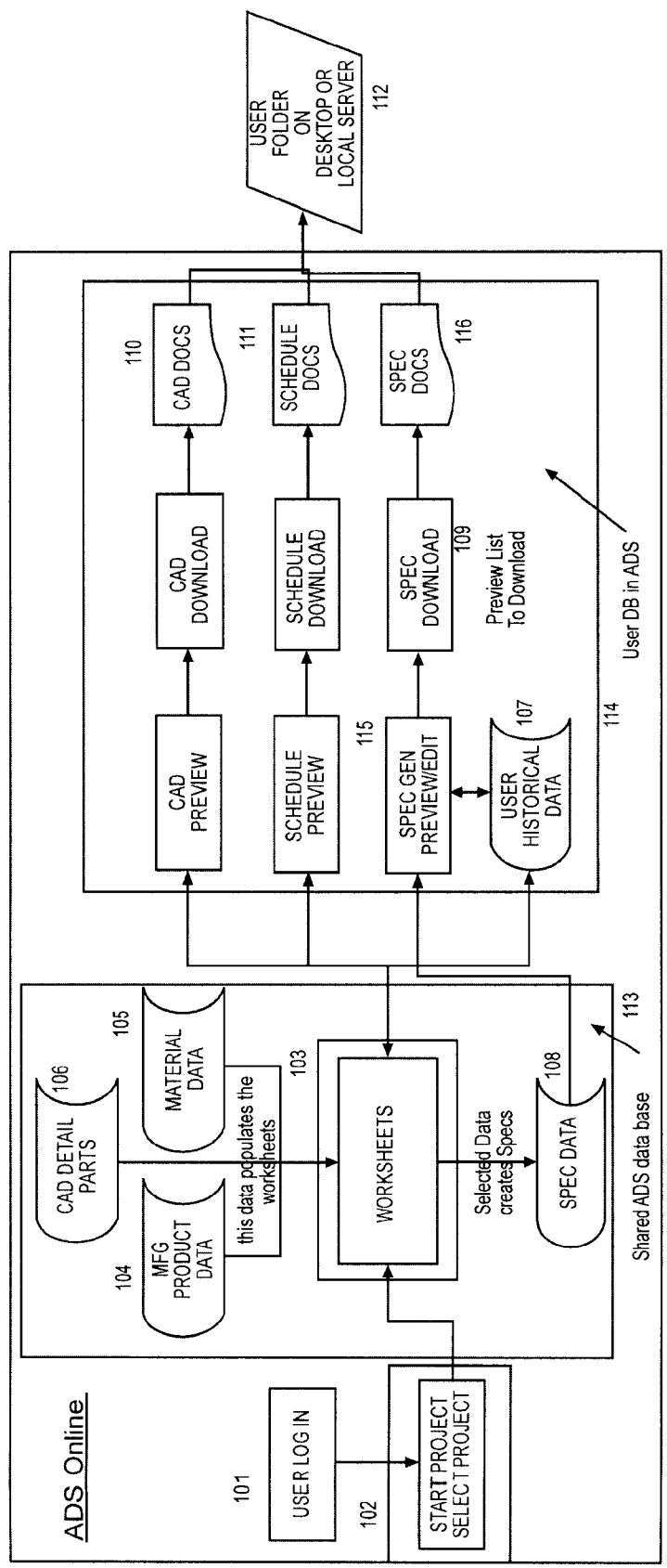
FIG. 1 is a flow diagram depicting how the process of creating architectural contract documents might be automated in some embodiments.

FIG. 1 sets forth a diagram depicting how some embodiments might be used to automate the process of creating one or more aspects of an architectural contract document. In FIG. 1, a system is set forth which comprises a shared database [113], which might contain data shared by multiple users of various embodiments of the invention, and a user database [114], which might store information related to a specific user and/or architectural project. When using an embodiment following FIG. 1, a user might begin by logging onto the system [101] and activate an architectural project [102]. This step of activating an architectural project [102] might comprise starting a new architectural project, or it might comprise selecting a previously begun architectural project which had been saved to the system.

Once the user had completed the steps of logging on [101] and activating an architectural project [102], the user might be given access to the shared database [113]. In some embodiments, that access might be used in filling out worksheets [103], such as the worksheet [103] shown in FIG. 2. In order to facilitate the act of filling out the worksheets [103], some embodiments might have the particular fields in the worksheets [103] linked to data regarding attributes of elements which could be used in an architectural project, which might be stored in the shared database [113]. That data might then control the contents of drop down menus which might be presented to the user for filling out particular data fields in the worksheets [103]. In some embodiments, the data regarding attributes of elements which could be used in an architectural project might be organized into data structure (e.g., tables) based on data type, such as manufacturer's product data [104], and materials data [105]. Additionally, there might be further data structures containing information related to CAD drawings [106] which could be used to create the Detail aspect of an architectural contract document. In some embodiments, such data structures might contain, or be mapped to, drawing templates which might be customized for particular projects, while in other embodiments the CAD detail data [106] might contain information related to how particular elements such as windows or doors might be depicted in a CAD drawing. Still other embodiments might include CAD detail data [106] which contains information of both types.

In addition to using data stored in the shared database [113] to determine the information which could be entered in the data fields of the worksheet [103], some embodiments might also use data stored in the user database [114] for a similar purpose. For example, in some embodiments, there might be a data structure in the user database [114] containing user historical data [107] that could be used to populate one or more worksheets [103] with information selected by the user previously, either in the same project, or in other related or non-related projects.

In embodiments following FIG. 1, once the user wished to generate one or more aspects of the architectural contract document, or if the user wished to preview the aspects of the architectural contract document, the information entered using the worksheets [103] might be combined to create the appropriate aspects. As an example of this creation, consider the creation of the specification aspect of the architectural contract document. To facilitate the creation of specifications, some embodiments might include data regarding prewritten specification sections [108] which might be contained in the shared database 114. In some embodiments these prewritten specification sections might be mapped to individual fields in one of the worksheets [103]. In various embodiments, different levels of mapping detail might be utilized, with some embodiments mapping paragraphs to worksheet fields, others mapping on the level of subparagraphs, sentences, or even on the level of individual words. Still other embodiments might include multiple types of mapping, with some relationships mapped on the paragraph level, some relationships mapped at the word level, and some relationships mapped at intermediate levels of granularity. As an example of mapping at the granularity level of a single word, consider an embodiment in which the specification database included the prewritten sentence "build the door out of _____ and apply _____ finish." In such an embodiment, the first blank might be mapped to a data field in a worksheet where the user could indicate a material type for doors, while the second blank could be mapped to a data field in which the user could indicate a finish to apply. Then, to create the specification, the prewritten specification sections might be assembled into a single document, or a group of final documents, which could be viewed and/or edited by the user [115]. The user might then download those documents [109], and store them in a folder on the user's local machine [112], or might save them as historical data [107] which might be utilized in the future.

By comparison with the process of generating the specification aspect, the processes for generating the detail aspect and the schedule aspect might be relatively straightforward since, in some embodiments, there might not be a need to map pre-created sections of the aspects of the contract document to the data entered in the worksheets [103]. Thus, the documents for the detail [110] and schedule [111] aspects might be generated directly from the worksheets [103]. The process of downloading such documents might then be the same as described above regarding the specification.

Of course, it should be understood that, while the above discussion of FIG. 1 focused on embodiments containing both a remote database and a user database, and in which there was a certain organization of the data in those databases, the invention is not limited to that organization, and the organization set forth above might be modified without departing from the scope or spirit of the invention. For example, in some embodiments, rather than having separate shared and user databases, all data might be stored in either a remote shared database, or a local user database. Alternatively, instead of having only two databases as set forth regarding FIG. 1, some embodiments might be organized into a multiple dedicated database, such as a separate specification database, a separate manufacturer's product database, a separate material database, etc. Further, in some embodiments, the various databases might store different, or additional information. For example, in some embodiments, either in addition to the user historical data [107], or as an alternative to the user historical data [107], the user database [114] might store template and/or project administration data. Thus, the discussion above regarding FIG. 1 should be understood to be only illustrative of a particular method of practicing the invention, and other methods will be immediately obvious to one of ordinary skill in the art which might be practiced without departing from the scope or spirit of the invention.

In another embodiment of the invention, in addition to, or as an alternative to, the worksheets described above, the user might be allowed to use a CAD interface to create architectural drawings. In some embodiments, such a CAD interface might be simply grafted onto an embodiment following FIG. 1, with the elements incorporatable into the CAD drawing being determined by the contents of the shared database [113] in the same way that the data fields of the worksheets [103] were in the previous discussion. Indeed, in some embodiments, a user might edit a drawing using a CAD interface, then use the worksheets [103] to alter the attributes of an element incorporated into the CAD drawing, and the embodiment might automatically modify the CAD drawing according to the change made to the worksheet [103]. Alternatively, or additionally, in some embodiments, if the user enters data related to an attribute of an element used in an architectural project in a worksheet [103], and then modifies that element in a CAD drawing, the embodiment might automatically modify the value displayed in the worksheet [103]. In still other embodiments, there might be templates for CAD drawings, perhaps stored in the CAD detail parts data structure [106], which might be either incorporatable into a drawing created using the CAD utility, or customizable utilizing the CAD utility. In some embodiments, the CAD drawings, or the contents of the CAD detail parts data structure [106] might comprise vector equations representing the geometry of the particular parts, templates, or drawings.

Figure 6:
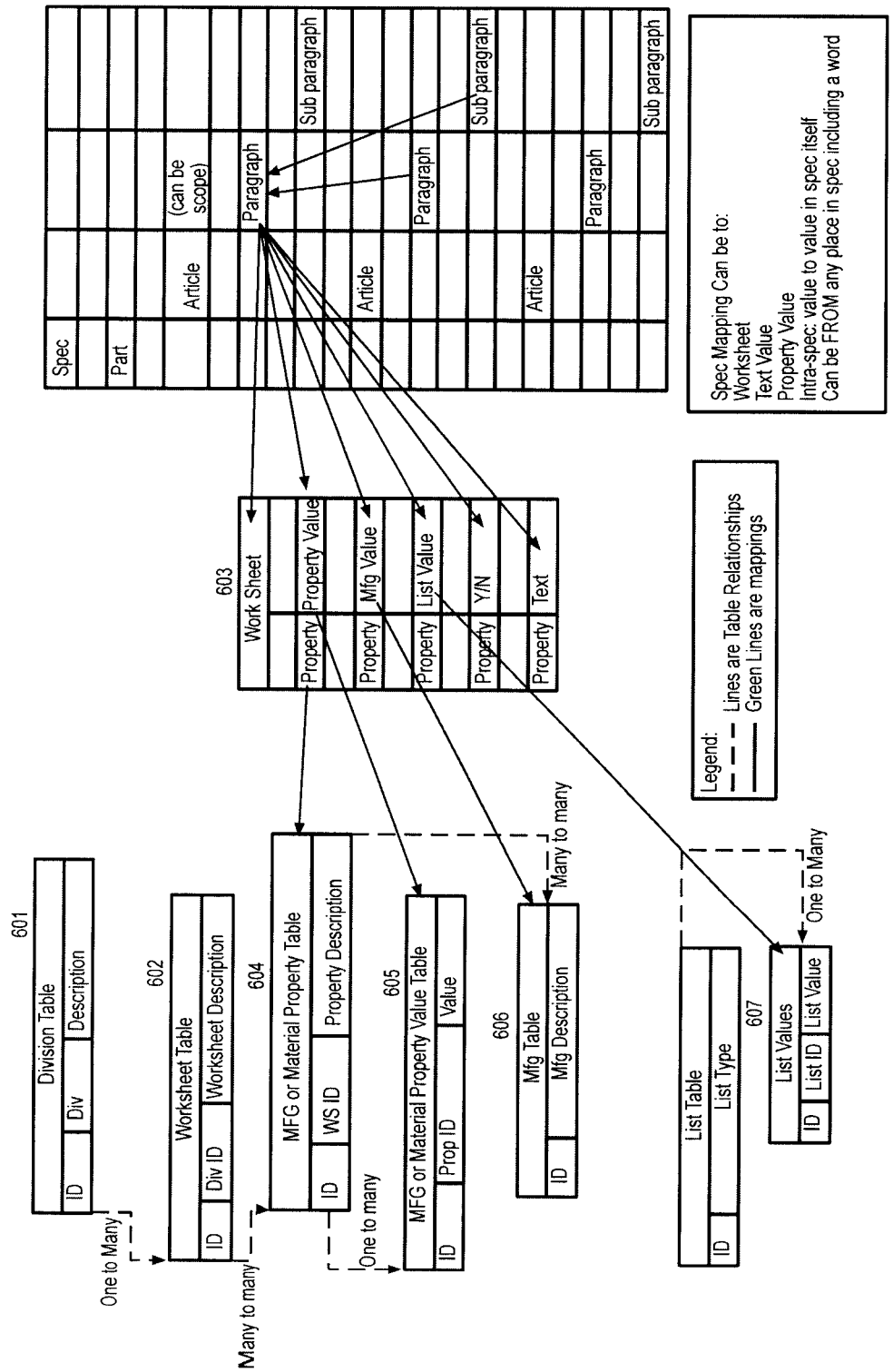
FIG. 6 is a diagram setting forth mapping relations which might exist between sections of a specification, worksheets and other predefined data in some embodiments.

As a demonstration of the nature of the relationships which might be premapped in some embodiments, consider the diagram of FIG. 6, which depicts how certain information contained in one or more databases might be organized into tables, the values of which might be mapped to data fields in worksheets, which might in turn be mapped to particular sections of a specification. Initially, note in FIG. 6 that there might be a Division Table [601] might itself contain worksheet tables [602] representing the worksheets [603] which might be filled out by a user. Each data field within a worksheet might represent a single property of an element which could be incorporated into an architectural project, though in some embodiments multiple data fields might be used to represent a property of an element, or a single data field might be used to represent multiple properties of an element. However, returning to FIG. 6, the properties which could be defined in a worksheet [603] might be determined by the value of a Manufacturer or Material Property Table [604], the contents of which might be premapped to the worksheet [603]. In some embodiments, once the user had indicated a property to be defined, the user might have the option of selecting a value for that property, perhaps from a Manufacturer or Material Property Value Table [605], from a Manufacturer's Table [606] (which might hold a description of the element created by the manufacturer) or from a table of list values [607]. Subsequently, when the user has used the worksheets to indicate the data values for the elements to be incorporated into the architectural project, the specification might be automatically generated by using those data values to select pre-written specification sections. In some embodiments, the pre-written specification sections might also be premapped, perhaps to the data fields in the worksheets, which could minimize the necessity for human intervention in the creation of the specification aspect of the contract document.

Figure 7A:
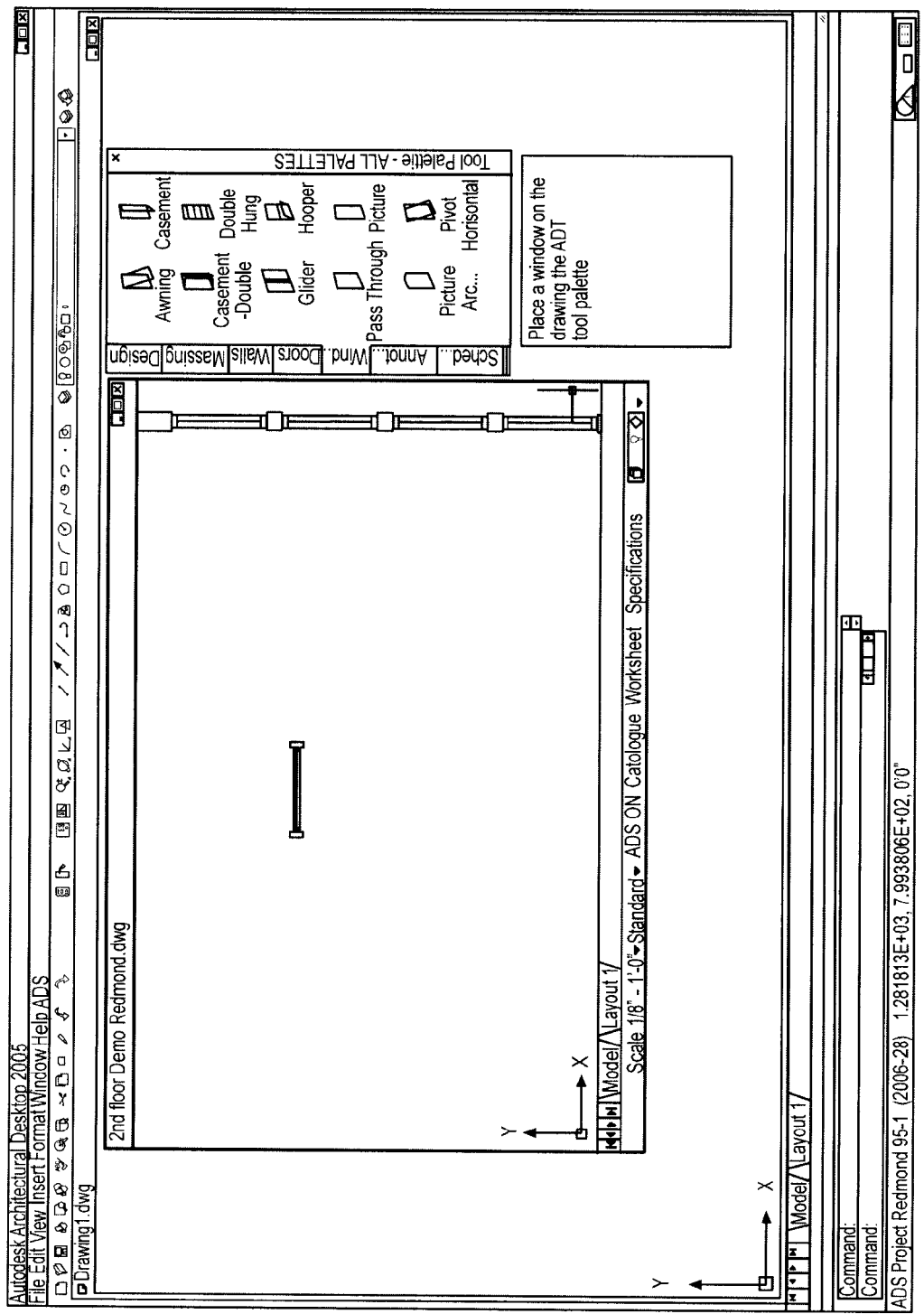
FIGS. 7a-7e depict a series of displays demonstrating a potential interaction between interfaces which might take place in some embodiments.
Figure 7B:
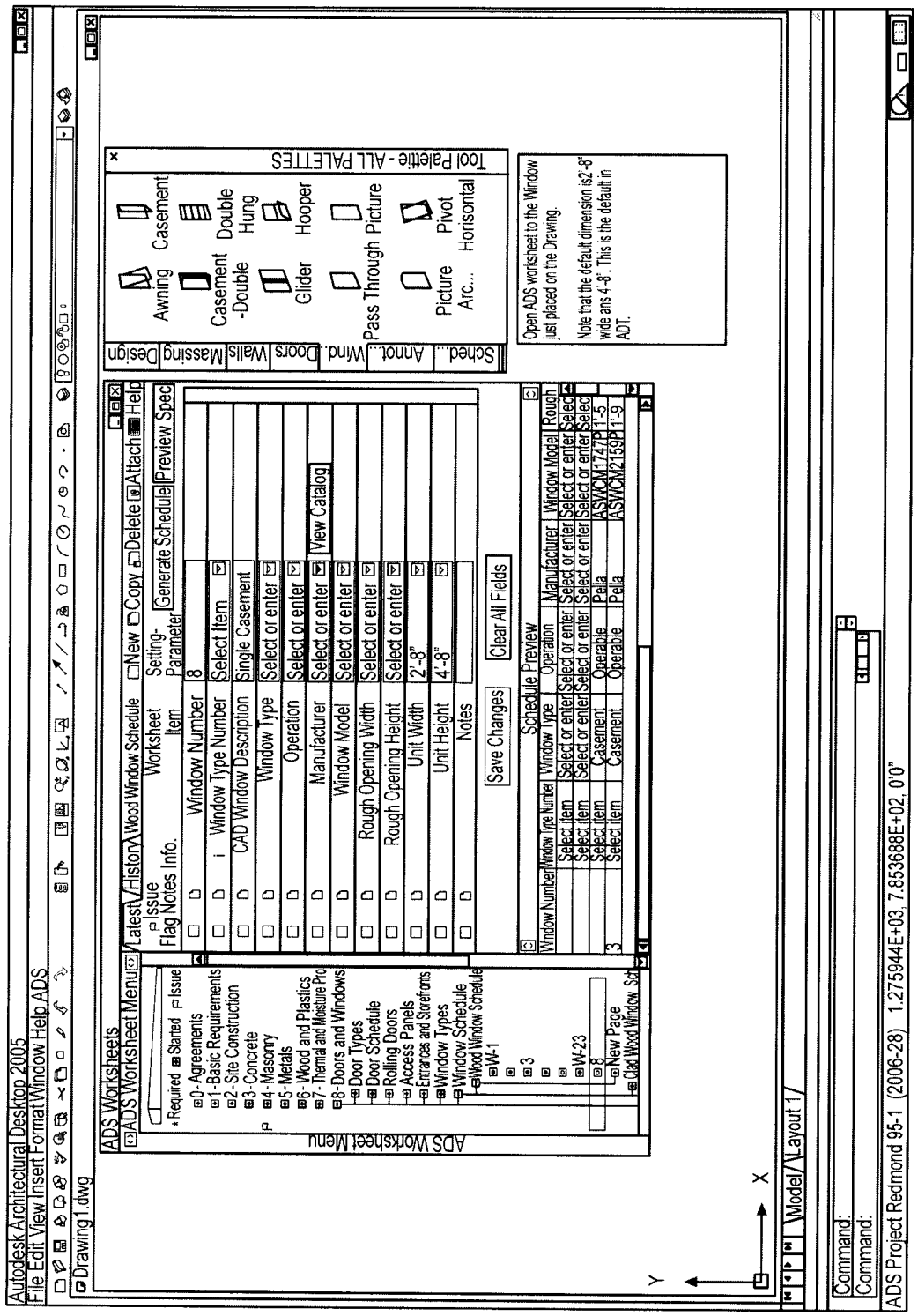
Figure 7C:
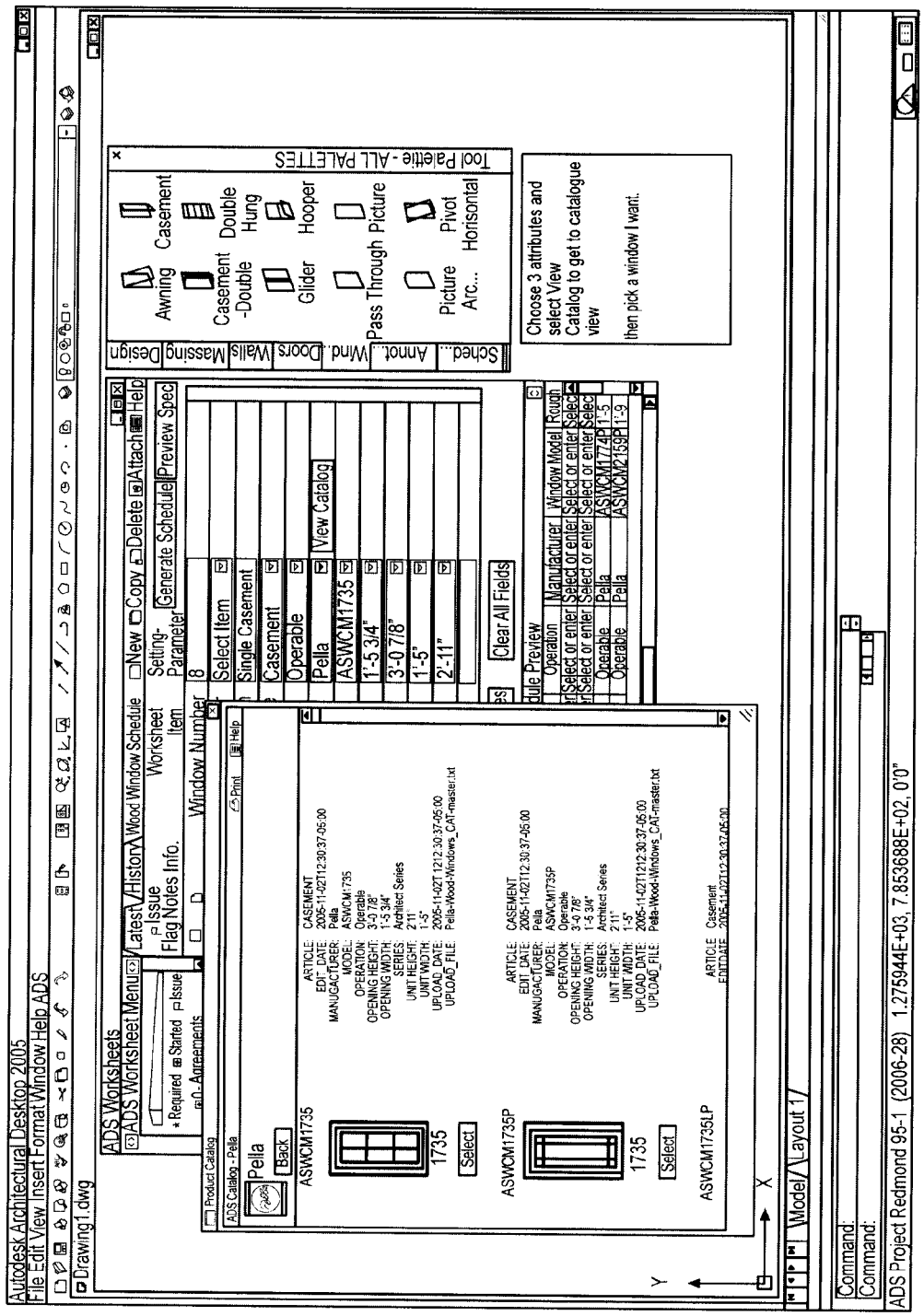
Figure 7D:
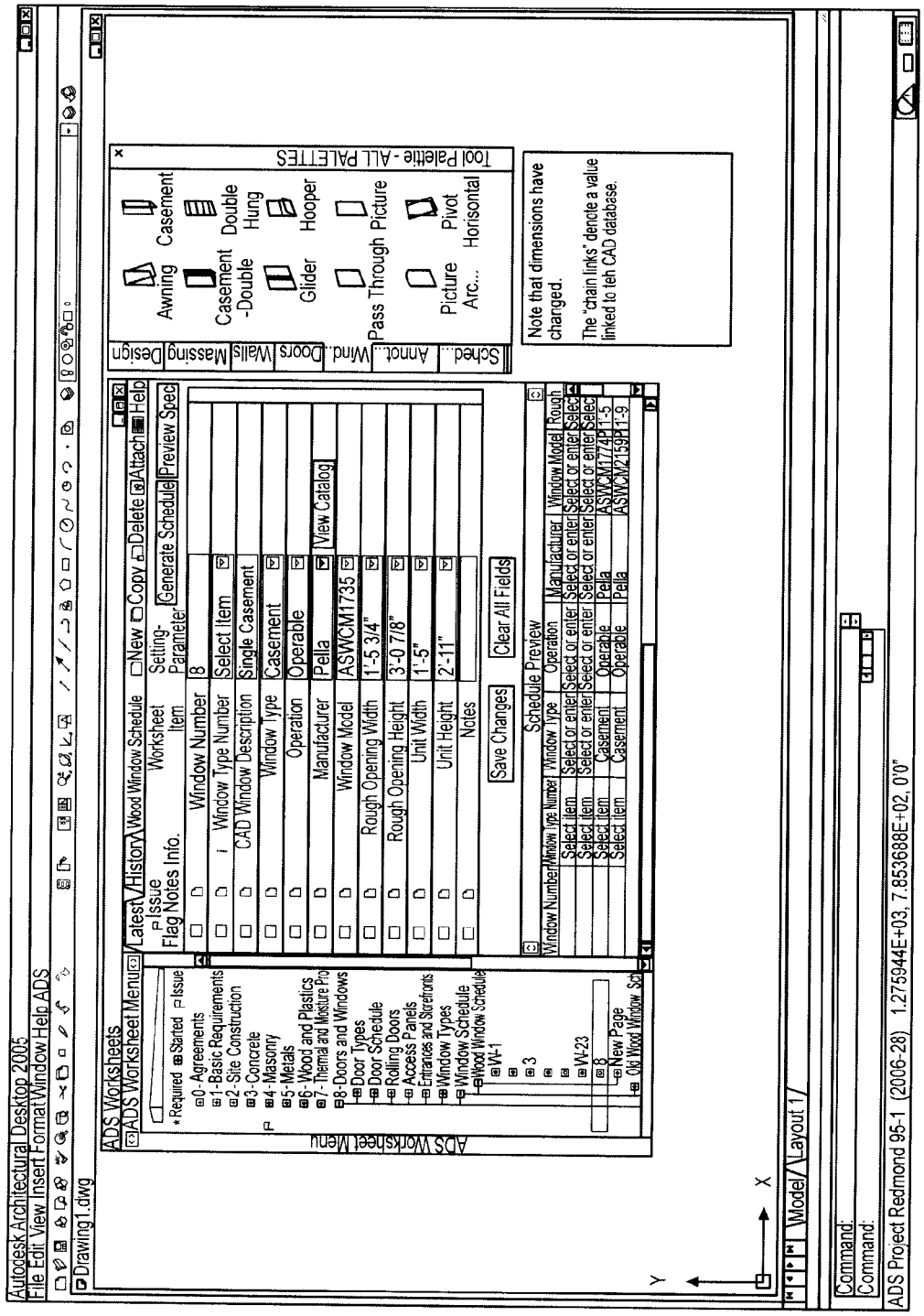
Figure 7E:
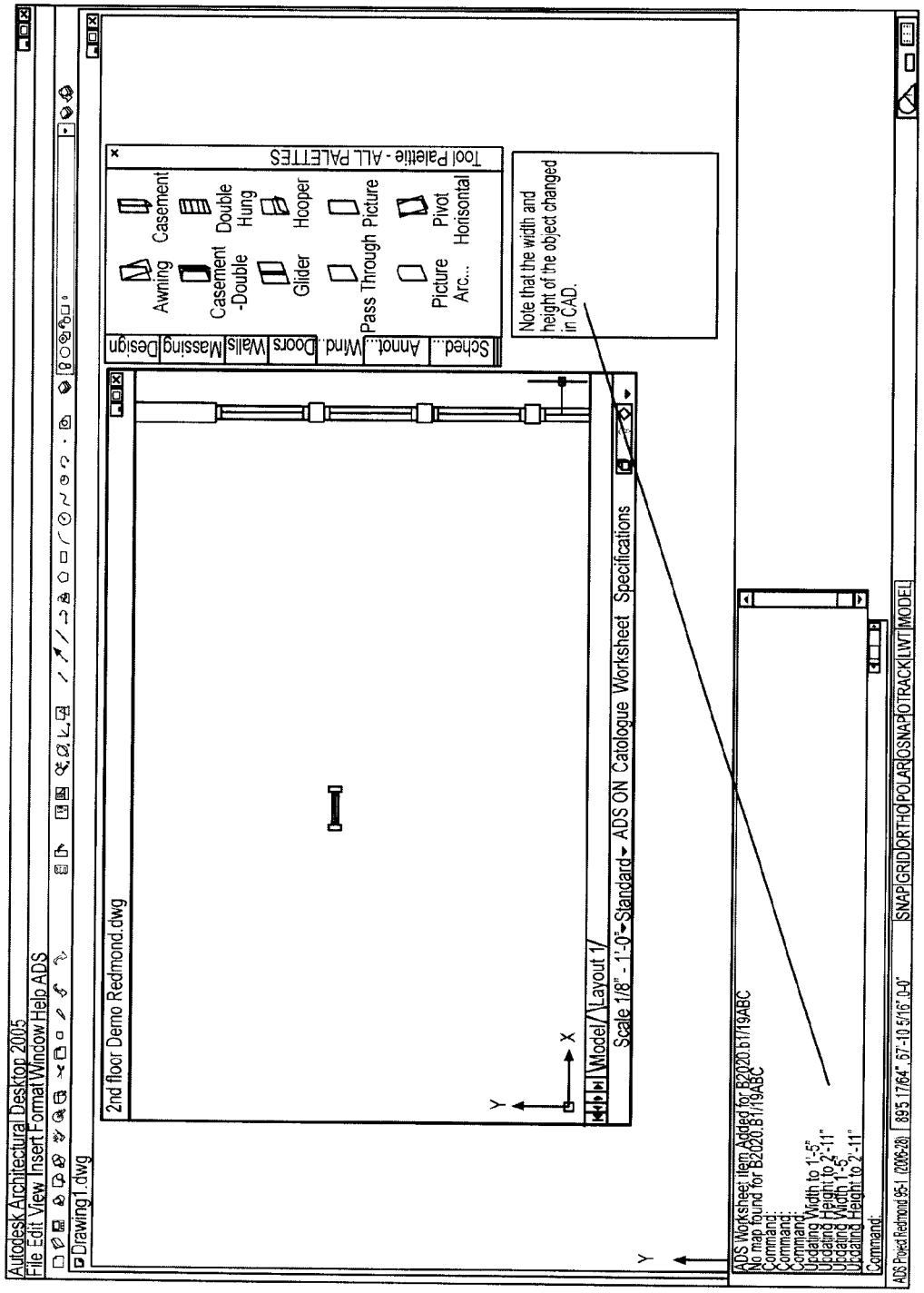

As a demonstration of a method by which worksheets might interact with a CAD interface, consider the screenshots of FIGS. 7a-7e. FIG. 7a depicts an interface which might be presented to a user who wishes to place a window in a CAD drawing. Note that, in FIG. 7a, the user is provided with a selection of potential windows which can be incorporated into the CAD drawing. This act of providing potential windows to the user can, in some embodiments, be used to help generate contract documents, since the windows from the group of potential windows might all be pre-mapped as described above. Turning to FIG. 7b, that figure depicts an interface which might be presented to a user who wished to enter information about a window in a worksheet. In FIG. 7c, an interface is depicted which might be presented to a user who wished to examine the windows provided by a particular manufacturer which might be incorporated into an architectural project. In FIG. 7d, an interface is depicted which might be presented to a user after that user selects one of the windows depicted in FIG. 7c. Finally, in FIG. 7e, an interface is depicted which might be presented to a user who wished to view a CAD drawing which incorporates the information provided in the worksheets of FIGS. 7b-7d. Note that, in FIG. 7e, the dimensions of the window which were entered into the worksheets have propagated back to the CAD drawing.

Figure 2:
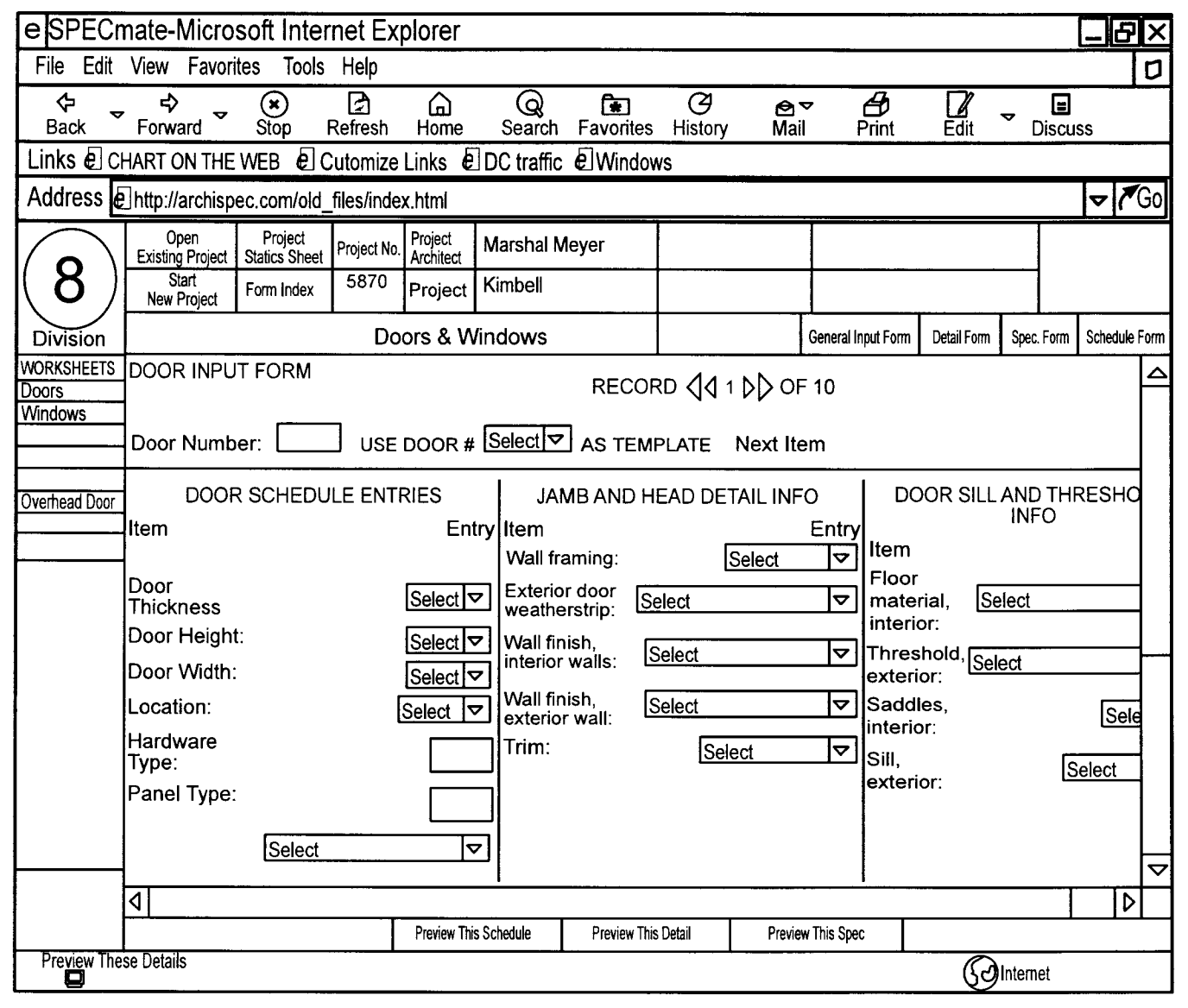

FIG. 2 is a screenshot of a browser-based Input Form 200 for Doors. An Input Form 200 is organized by Divisions, Schedules and Specification sections, including the data needed to generate those documents. The input form is specific for each category of work such as doors, windows, ceramic tile, flooring, and the like so it may readily be visible on a computer screen in as many screens as is necessary. In this way, the product selections, Schedules, Specifications, and Details are all developed for each category from one form. Once input, data may follow different data paths as illustrated below.

Some of the data is selected from drop down boxes by the User. These selections are stored in a User Data Base [114] for retrieval when the contract documents [110][111][116] are generated for preview or saved for download. This data can be used for only a single output document, such as the Schedule, for the Schedule and the Specification, for the Schedule and Detail, or for all three.

Some of the data is keyed in by the user into input boxes. As with the drop-down selections, these selections are stored in a User Data Base [114] for retrieval when the aspects [110][111][116] are generated for preview or saved for download.

Some of the data that is selected from drop down boxes in the worksheets or otherwise specified by the User may open in a browser a manufacturer catalogue page from which the user could select a catalogue item. The attributes of that item might then populate the worksheet [103] and might additionally be stored in a User Data Base [114] for retrieval when a Schedule, Specification, or Drawing is generated for preview or saved for download. This data may be assembled for generation of one or more of the various aspects of the contract document.

An item selected from the catalogue page that is a drawing, such as that available in *.dwg format, might become a part for inclusion in the CAD Docs [110] for that item. For example, a manufacturer's stock Detail for a window would be inserted into a window Detail for a specific project based on the other User selections, as described below for drawing data.

In some embodiments, the user might select a template for a drawing from a drop-down box on a worksheet [103]. The user might then select parts from a list in one or several drop-down boxes. These selections might be stored in a User Data Base [114]. When the CAD documents are generated for preview or download, the information might be assembled from the User Database [114] and the CAD documents [110] might be drawn using the template and the parts selected. Parts selected from a manufacturer's catalogue might also be selected and assembled into the CAD documents [110].

Data might be selected from drop-down boxes by the User. These selections might be stored in a User Data Base [114] and be retrieved when the Specification is previewed or generated for download. This data can be used for a Specification, for a Specification and a Schedule, for a Specification and a Drawing, or for all the three.

Figure 3:
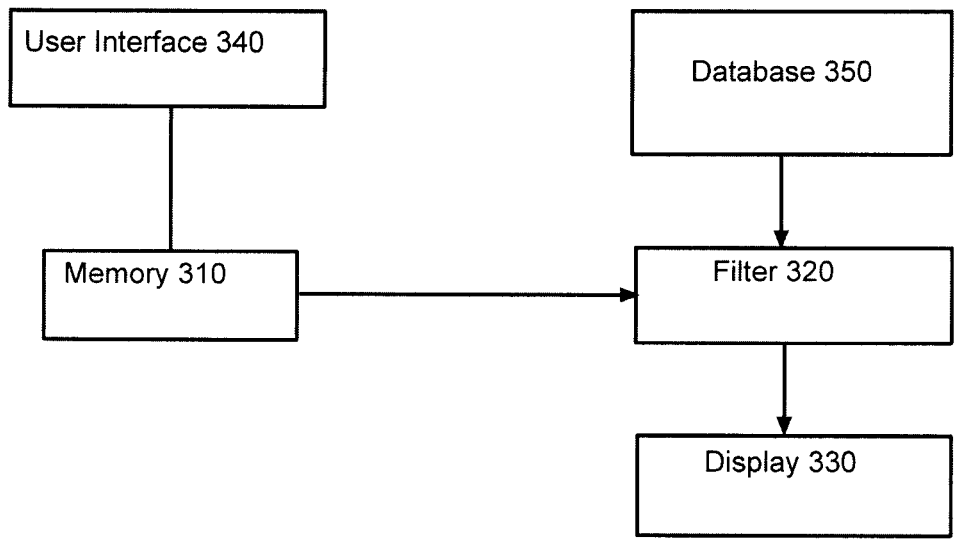
FIG. 3 is a data flow diagram depicting the manner in which user-selected attributes are filtered in some embodiments of the invention.

FIG. 3 is a data flow diagram depicting one manner in which user-selected attributes might be filtered. In one embodiment, the graphical User Interface [340] or GUI is the worksheet [103], though it might alternatively or additionally be understood to be a CAD interface, or any other interface through which a user might specify data related to an architectural project. Through the User Interface [340], the user selects the design information representing all possible input choices, such as user input text, user selected choices from the drop down menus related to one or more of the pieces of data stored in the database [350], which might be the shared database [113], the user database [114], or some other database, as appropriate for the particular embodiment of the invention. This text is associated with unique identifiers that are stored in the Memory 310 and the unique identifiers are compared with the information in the database [350]. This comparison provides the basis for filtering choices by the Filter 320 that will appear on the user's Display as the user continues on a Worksheet [103].

Figure 4:
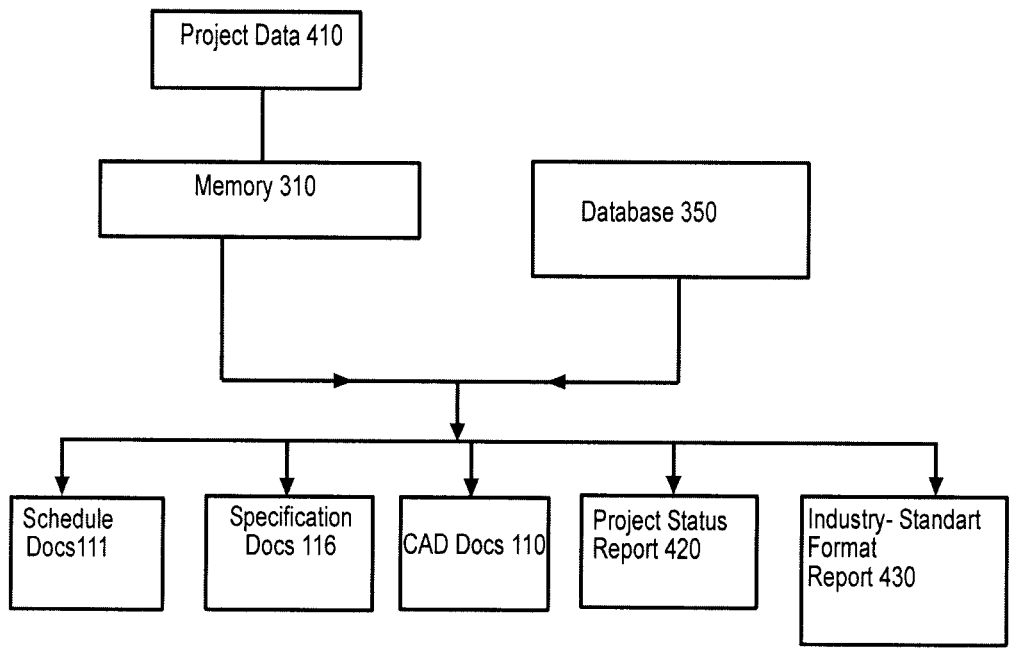
FIG. 4 is a block diagram of an embodiment of the present invention.

FIG. 4 is a block diagram of an embodiment of the present invention. Any Project Data 410 input into the system, whether related to design or other project aspects, such as using a project status input form, and from user text, user selections or imported from other digital forms, is stored in the Memory 310 and assembled with or without data from the Database [350], to generate one or more outputs, including, Specification documents [116], CAD Documents [110] (also referred to as Drawings, or Details), Schedule documents [111], Project Status Report 420 or an Industry standard Format Report 430, such as XML, or Industry Foundation Class tags, needed for contractors and maintenance persons to search.

Figure 5:
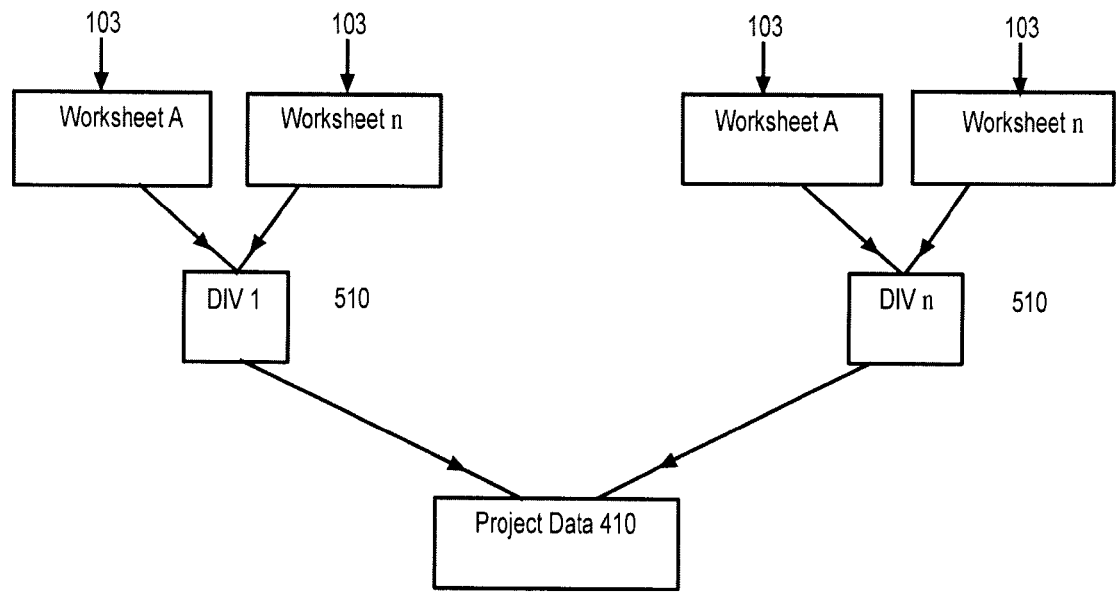
FIG. 5 is a data flow diagram depicting the manner in which the data input flows might be used to create the Project Data.

FIG. 5 shows more of a breakdown of the data input that makes up Project Data 410 as shown in FIG. 3 in that each Division 510 comprises data combined from several Worksheets [103], and in turn, the combination of Divisions makes up Project Data 410. This may include any imported, rather than input data.

The data selected and stored in the User Database [114] might be automatically associated with the appropriate aspects of the contract document and assembled into the aspects when requested. Each Worksheet [103] may have all or most types of associations. For example, text may be associated for use only in a Schedule, in a Schedule and a Specification, or only in a Specification. Text may be used to select CAD parts or a CAD template. Additionally, text that is associated for use in the Schedule or Specification may also be used to select CAD parts or CAD templates. In another embodiment, text that is associated for use in the Schedule or Specification may also be used to select product attributes for catalogue and manufacturer selection.

The text may be populated by records from a previously completed Schedule, such as a hardware type label on a Worksheet 103, such as a Door Schedule Worksheet, such that the box on the Worksheet 103 might remain blank until a hardware Schedule is started. In another embodiment, the text may be populated from a search of product attributes. For example, in some embodiments, upon selecting a manufacturer for a certain piece of hardware, the user might be provided a scanned and image-mapped catalogue page from which to select an item. The associated CAD part might be queued for insertion in the Drawing. Upon selection of an item, the data associated with that item may be used to populate the text boxes automatically. If no data is associated with that item, the user may add the appropriate data.

Text for use on a worksheet [103] may be populated from other worksheets [103] to select details already created in those other worksheets. For example, in some cases, details already created in other worksheets may be used to create the details of a second worksheet [103].

In some embodiments, the user may save any or all Worksheets [103] as a standard template for that particular Worksheet [103] for a given type of project. It may be within a particular project type and building code, so that the Worksheets [103] that have been selected as templates may be populated with data when a new project is started within one or both of the project and building code types.

In some embodiments, users may select a type of form to view for each Worksheet [103], such as a Worksheet for one or more of the Schedule, Drawing or Specification. In some embodiments, access for functions such as editing may be restricted to certain users. In other embodiments, the user may have access to customize a header. Users may have access to data such as a list of consultants, and information related to those consultants, for each Worksheet [103]. Internal links, such as to status sheets, a new project page, or the like may be provided.

In some embodiments of the present invention, the data required for developing the Schedules, though unique for each project, might be used to link a Specification, Schedule and Detail together. This can be useful in many situations, because, often, this is the one step in the process that architects take, regardless of whatever else they draw or what Specifications they write.

In that same vein, it should be noted that a building is often designed from the outside in, or from the general to the specific. The plans and elevations, which are pictures of the sides of a building, are usually the first to get designed with the sections and Details to follow. If an architect runs out of time in developing the aspects of the contract document, the Details and Specifications may suffer for lack of adequate attention, because, in many cases, these items are lowest on an architect's priority. Therefore it will often be of great benefit to have these tasks automated as much as possible.

In some embodiments, all of the above data paths may work simultaneously. The work might be previewable at any time in any format. Any one or all of the documents might be generated. All documents may be automatically stored for future download. All documents may be saved in a format selected by the user. For example, the documents may be saved in .dwg, .dxf, .rtf, .doc, .wpf, .xls, or other formats.

In some embodiments, as the user moves from Worksheet to Worksheet, record to record, or detail to detail, the previous work may be recorded in the User Data Base [114] for later retrieval. In some embodiments, the User Data Base [114] might function as a switching device that stores all the selected items and their associated unique identifiers. It may also include industry-acceptable tags such as Industry Foundation Class tags. In some embodiments, when the user requests that the various documents be generated, the User Data Base [114] might be queried and the documents generated.

Schedules may be created, for example, in spreadsheet, CAD, XML or other formats that will be apparent to one skilled in the art. The user may preview a Schedule, and may print it. The user may select a record in the previewed Schedule and toggle to that record on a Worksheet. Changes may be made to the Schedule, which may also allow for related changes to the Worksheet. The Schedule file may be created upon a command from the user or created automatically.

Drawings may be created, for example, in CAD or other formats that will be apparent to one skilled in the art. The user may select a template and all required parts for a Detail, which may be previewed and printed. The user may also digitally store the Drawing. In one embodiment, Drawing creation may be accomplished by commands from the User Database [114] or a middle tier program, which might instruct a CAD program to open a template file and enter the selected parts to create the Drawing, which can then be previewed or stored as desired.

Specifications may be created, for example, in XML, word processing or other formats that will be apparent to one skilled in the art. The Specification may be editable and "autoformatted", such that the information is linked to provide for automatic re-numbering of paragraphs and subparagraphs, as changes are made. The Specifications may be previewed as the data begins to populate it. There may be provided a text editor to assist in editing a final draft of the Specification. The associated digital file may be saved and retrieved, for example, by any available means, such as by FTP (file transfer protocol).

What is claimed is:

1. A non-transitory computer readable storage medium comprising instructions which are operable to configure a computer to perform a set of acts comprising:
   a) providing a form specific to an architectural work category, the form comprising a field corresponding to a dimension of an architectural feature corresponding to the architectural work category, wherein the architectural feature has a geometry defined at least in part by the dimension;
   b) providing a computer aided design interface to the user, the computer aided design interface operable by the user to depict the architectural feature corresponding to the architectural work category, wherein depicting the architectural feature comprises depicting the geometry of the architectural feature;
   c) receiving a value for the dimension for the architectural feature, wherein the value is entered into-the form specific to the architectural work category;
   d) automatically updating the computer aided design interface with the value, wherein automatically updating the computer aided design interface comprises modifying the geometry of the architectural feature depicted by the computer aided design interface to have the value for the dimension entered into the form specific to the architectural work category;
   e) automatically generating multiple aspects of an architectural contract document, the multiple aspects comprising:
      i) a schedule, wherein the schedule is an aspect of the architectural contract document comprising a listing of attributes of repetitive building parts;
      ii) a specification, wherein the specification is an aspect of the architectural contract document comprising written, detailed descriptions of the materials and processes that make up a the building; and
      iii) a detail, wherein the detail is an aspect of the architectural contract document comprising drawings of parts making up the building;
      wherein automatically generating the multiple aspects comprises incorporating the input into at least one of the aspects; and
wherein the computer aided design interface is operable to depict the architectural feature when the architectural feature is encoded using *.dwg format, and wherein automatically generating the detail aspect comprises generating one or more *.dwg files encoding the architectural feature.

2. The non-transitory computer readable storage medium of claim 1, wherein:
   a) the form specific to an architectural work category is a window form;
   b) the architectural feature corresponding to the architectural work category is a window; and
   c) the dimension of the window for which the value is entered into the window form is taken from the list consisting of:
      i) a height for the window; and
      ii) a width for the window.

3. The non-transitory computer readable storage medium of claim 1, wherein the computer aided design interface is operable to depict the architectural feature when the geometry of the architectural feature is encoded using one or more vector equations.

4. The non-transitory computer readable storage medium of claim 3, wherein automatically updating the computer aided design interface comprises modifying the one or more vector equations encoding the geometry of the architectural feature to include the value for the dimension entered into the form specific to the architectural work category.

5. A computer implemented method for automating an architectural process of creating an architectural contract document using a computer comprising a processor and a computer readable storage medium having stored thereon a set of instructions which, when executed by the processor, cause the computer to perform the steps of the computer implemented method, the steps of the computer implemented method comprising:
   a) providing, on a display, a form specific to an architectural work category, the form comprising a field corresponding to a dimension of an architectural feature corresponding to the architectural work category, wherein the architectural feature has a geometry defined at least in part by the dimension;
   b) providing, on the display, a computer aided design interface to the user, the computer aided design interface operable by the user to depict the architectural feature corresponding to the architectural work category, wherein depicting the architectural feature comprises depicting the geometry of the architectural feature;
   c) receiving a value for the dimension for the architectural feature, wherein the value is entered into the form specific to the architectural work category;
   d) automatically updating the computer aided design interface with the value, wherein automatically updating the computer aided design interface comprises modifying the geometry of the architectural feature depicted by the computer aided design interface to have the value for the dimension entered into the form specific to the architectural work category; and
   e) automatically generating multiple aspects of an architectural contract document, the multiple aspects comprising:
      i) a schedule, wherein the schedule is an aspect of the architectural contract document comprising a listing of attributes of repetitive building parts;
      ii) a specification, wherein the specification is an aspect of the architectural contract document comprising written, detailed descriptions of the materials and processes that make up a building; and
      iii) a detail, wherein the detail is an aspect of the architectural contract document comprising drawings of parts making up the building;
      wherein automatically generating the multiple aspects comprises incorporating the input into at least one of the aspects;
   wherein:
   i) the form specific to the architectural work category and the computer aided design interface are provided to an architect producing a design for a building based on a concept for the building previously provided to the architect by an owner;
   ii) the value for the dimension for the architectural feature is received from the architect; and
   iii) the architectural contract document is the architectural contract document for the building, comprises plans for the building, and is generated based at least in part on the value received from the architect.

6. The computer implemented method of claim 5, wherein:
   a) the form specific to an architectural work category is a window form;

b) the architectural feature corresponding to the architectural work category is a window; and
c) the dimension of the window for which a value is entered into the window form is taken from the list consisting of:
   i) a height for the window; and
   ii) a width for the window.

7. The computer implemented method of claim 5, wherein the computer aided design interface is operable to depict the architectural feature when the architectural feature is encoded using *.dwg format, and wherein automatically generating the detail aspect comprises generating one or more *.dwg files encoding the architectural feature.

8. The computer implemented method of claim 5, wherein the computer aided design interface is operable to depict the architectural feature when the geometry of the architectural feature is encoded using one or more vector equations.

9. The computer implemented method of claim 8, wherein automatically updating the computer aided design interface comprises modifying the one or more vector equations encoding the geometry of the architectural feature to include the value for the dimension entered into the form specific to the architectural work category.

10. A computer implemented method for automating an architectural process comprising:
   a) receiving, from an owner of a building, a concept for the building;
   b) providing, on a display:
      i) a form comprising a field corresponding to a dimension of an architectural feature for the building; and
      ii) a computer aided design interface depicting a geometry for the architectural feature, wherein the geometry is defined at least in part by the dimension;
      wherein the providing takes place after receipt of the concept for the building from the owner;
   c) receiving, from an architect responsible for creating plans for the building, a value for the dimension of the architectural feature for the building,
      wherein the value for the dimension is received based on the architect performing an act taken from a set of acts consisting of:
         i) entering the value into the field in the form; and
         ii) modifying the geometry for the architectural feature depicted in the computer aided design interface;
   d) propagating the value received from the architect, wherein propagating the value comprises, using a computer configured to, if the value is entered into the field in the form, automatically update the computer aided design interface with the value by performing acts comprising modifying the geometry for the architectural feature depicted in the computer aided design interface to have the value for the dimension provided by the architect;
   e) automatically generating an architectural contract document by performing acts comprising:
      i) generating a schedule for the building, wherein the schedule comprises a listing of repetitive parts for the building;
      ii) generating a specification for the building, wherein the specification comprises written, detailed descriptions of the materials and processes that make up the building
      iii) generating a detail for the building, wherein the detail comprises drawings of parts of the building;
   wherein the value for the dimension received from the architect is automatically incorporated into one or more aspects of a plurality of aspects of the architectural contract document;
   wherein the plurality of aspects of the architectural contract document comprise the schedule, the specification, and the detail; and
   wherein plans for the building are generated as part of the detail based at least in part on the value received from the architect.

11. The method of claim 10, wherein propagating the value received from the architect comprises simultaneously incorporating the value received from the architect into the schedule, the specification, and the detail.

* * * * *